No. 883,202. PATENTED MAR. 31, 1908.
E. A. JOHNSTON.
VEHICLE BRAKE.
APPLICATION FILED AUG. 16, 1907.
2 SHEETS—SHEET 1.
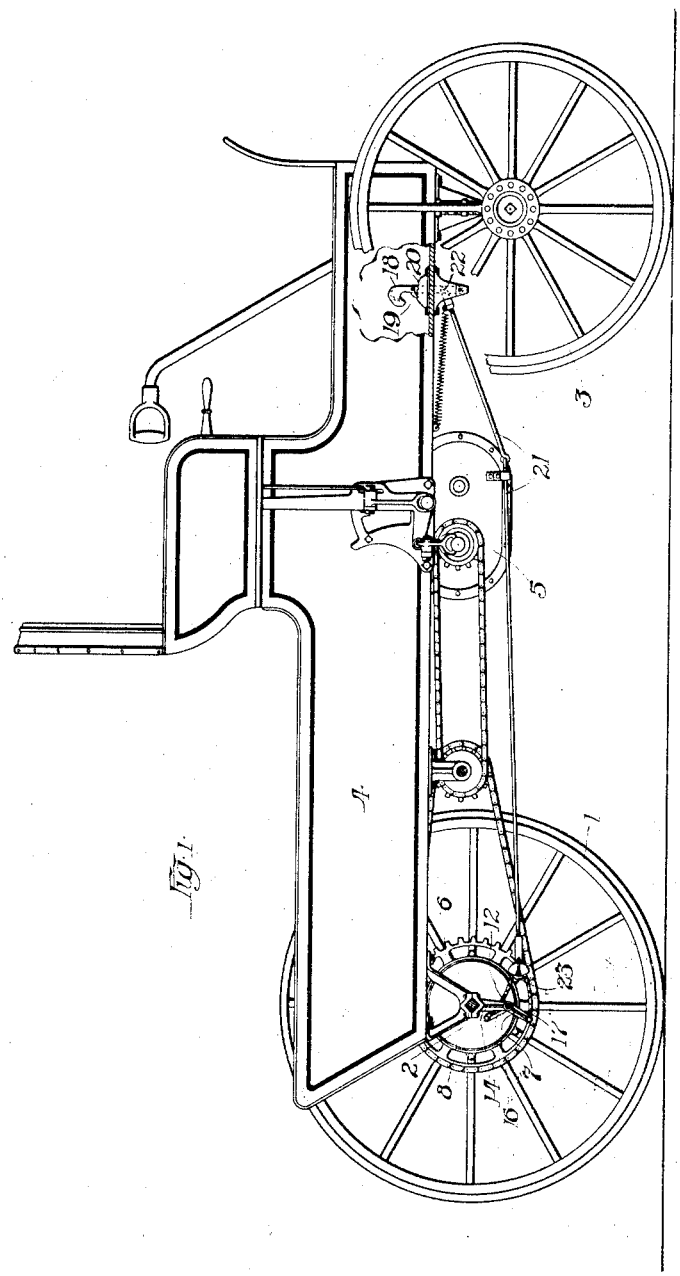
Witnesses
F.W. Hoffmeister
J.N. Daggett
Inventor
Edward A. Johnston
By E.W. Burgess
Attorney

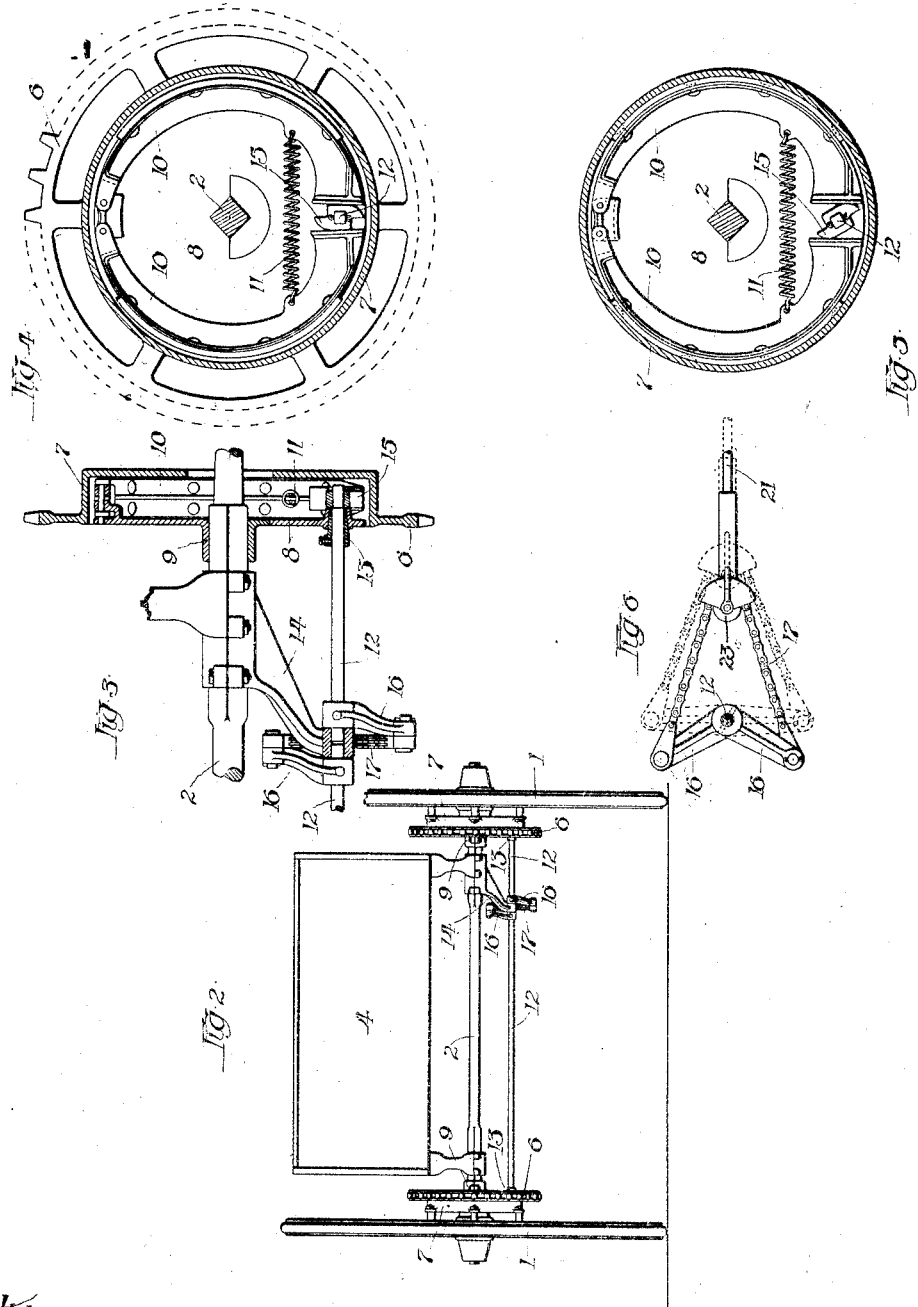

UNITED STATES PATENT OFFICE.

EDWARD A. JOHNSTON, OF STERLING, ILLINOIS, ASSIGNOR TO INTERNATIONAL HARVESTER COMPANY, A CORPORATION OF NEW JERSEY.

VEHICLE-BRAKE.

No. 883,202.   Specification of Letters Patent.   Patented March 31, 1908.

Application filed August 16, 1907. Serial No. 388,761.

*To all whom it may concern:*

Be it known that I, EDWARD A. JOHNSTON, a citizen of the United States, residing at Sterling, in the county of Whiteside and State of Illinois, have invented certain new and useful Improvements in Vehicle-Brakes, of which the following is a specification.

My invention relates to vehicle brakes in general, and particularly to that class wherein rotatable friction elements are mounted upon opposite sides of the vehicle, and single means controlled by the operator being operable in a manner to cause simultaneous engagement of relatively fixed friction elements with said rotatable elements; and the object of the invention is to provide such friction engaging means with equalizing devices that will insure a proper transmission of force to the operative parts of the oppositely disposed friction elements regardless of any unequal wear or adjustment of the same. These objects are attained by the mechanism illustrated in the accompanying drawings, in which—

Figure 1 is a side view of a vehicle with one of the rear wheels removed and other parts broken away for the purpose of clearly illustrating the application of my invention thereto; Fig. 2 is a rear end view of Fig. 1; Fig. 3 is an enlarged detached detail view, partly in section, of part of the friction brake elements and the controlling means for the same; Fig. 4 is an end view of part of Fig. 3, and illustrating the manner of mounting the rotatable friction elements in combination with the relatively fixed members; Fig. 5 is a view similar to Fig. 4; and Fig. 6 represents a detail plan view of the equalizing means.

Referring to the drawings, wherein like reference numerals designate the same parts throughout the several views, 1 represents the rear road wheels mounted upon a fixed axle 2, and 3 represents the front wheels; 4 is the vehicle body suitably mounted upon the supporting axles, and 5 designates a source of power from which motion is transmitted to the propelling wheels in any preferred manner, as by means of sprocket wheels 6 secured to and rotating coaxially with the rear wheels upon opposite sides of the vehicle.

7 represents annular rims that are preferably integral with said sprocket wheels and provided with interior friction surfaces; 8 represents disks fitting within the annular rims and having hub portions 9, by means of which the disks are secured to the axle 2.

10 represents friction shoes having their adjacent upper ends pivotally connected with the fixed disks and their lower free ends connected by means of tension springs 11, said shoes being adapted to engage frictionally with the rims when moved in a direction in opposition to the force of said springs. To separate the free ends of the shoes and cause their body portions to contact with the rotatable friction rims, there is provided a two-part rock-shaft 12, having the outer ends of its parts rotatably mounted in the fixed disks 8 by means of tapered sleeves 13 secured to said shaft and having bearings in said disks; the inner ends of the parts being journaled in a depending bracket 14 secured to the axle 2; and secured to the outer ends of the shaft, and engaging with the free ends of the shoes 10, are double wiper cams 15 adapted to separate said free ends of the shoes when the shaft is rocked in one direction and to permit them to approach each other when said shaft is rocked in an opposite direction. The shaft is arranged below and substantially parallel with the axis of the wheels, and lever arms 16 are secured to each part upon opposite sides of the bracket 14 and extend in opposite directions from the axis of said shaft; and a chain 17 connects the outer ends of said levers.

Mounted upon the vehicle body is a foot lever 18, having a pawl 19 adapted to engage with a toothed sector 20 in a well known way to hold the lever in adjusted position, and 21 represents a brake controlling rod movable longitudinally and having its forward end pivotally connected with the foot lever at 22, and its rear end movably connected with the chain 17, intermediate its ends, by means of a roller 23 mounted on the rod. The flexible connection between the ends of the lever arms, in combination with the movable roller mounted upon the brake controlling rod, operates as an equalizing means in transmitting force applied to the foot lever in one direction to the separate parts of the rock-shaft, and thereby compensates for any unequal wear upon the friction elements located at opposite sides of the vehicle, or for any slight variation in the adjustment of the associated parts of the mechanism.

What I claim as my invention, and desire to secure by Letters Patent, is:

1. A brake mechanism for vehicles having, in combination, rotatable friction elements deriving motion from the road wheels, relatively fixed friction elements mounted upon a part of the vehicle, means for causing said fixed elements to engage with said rotatable elements, said means comprising separate rock-shafts, means for rocking said shafts in opposite directions, said means including separate lever arms secured to said shafts and extending in opposite directions from the axes thereof, a flexible connection between the outer ends of said arms, a brake controlling member adapted to be manipulated by the operator and having one end slidably engaging with said flexible connection intermediate the ends thereof.

2. A brake mechanism for vehicles having, in combination, friction elements secured to road wheels upon opposite sides of the vehicle and rotatable coaxially therewith, relatively fixed friction elements mounted upon the vehicle, means for causing said fixed elements to engage with said rotatable elements, said means comprising a two-part rock-shaft having its outer ends operatively engaging with said fixed friction elements, means for rocking the parts of said shaft in opposite directions, said means including lever arms secured to the inner adjacent ends of said shaft and extending in opposite directions from the axis thereof, a flexible connection between the outer ends of said arms, a brake controlling member adapted to be manipulated by the operator and having one end engaging with said flexible connection intermediate the ends thereof.

EDWARD A. JOHNSTON.

Witnesses:
LEO. J. FORSTER,
GEO. K. BARTON.